United States Patent
Rompage et al.

(10) Patent No.: US 10,308,285 B2
(45) Date of Patent: Jun. 4, 2019

(54) VEHICLE FRAME ASSEMBLY

(71) Applicant: Honda Motor Co., Ltd., Tokyo (JP)

(72) Inventors: Adam J. Rompage, Dublin, OH (US); Edward W. Bach, Marysville, OH (US); Kurtis Ray Horner, Marysville, OH (US); Aron K. Madsen, Marysville, OH (US); Anthony Ordonio, Jr., Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/651,502

(22) Filed: Jul. 17, 2017

(65) Prior Publication Data
US 2017/0313356 A1 Nov. 2, 2017

Related U.S. Application Data

(62) Division of application No. 14/991,472, filed on Jan. 8, 2016, now Pat. No. 9,738,318.

(51) Int. Cl.
| | |
|---|---|
| *B60J 7/00* | (2006.01) |
| *B62D 21/15* | (2006.01) |
| *B62D 25/04* | (2006.01) |
| *B62D 25/08* | (2006.01) |
| *B62D 27/02* | (2006.01) |

(52) U.S. Cl.
CPC ............ *B62D 21/15* (2013.01); *B62D 25/04* (2013.01); *B62D 25/08* (2013.01); *B62D 27/023* (2013.01)

(58) Field of Classification Search
CPC ....... E04B 1/20; B01D 21/0024; B01D 21/06; B01D 21/14; B01D 21/18; B62D 23/005; B62D 29/008; H01L 2924/0002
USPC ................................................. 296/203.04
See application file for complete search history.

(56) References Cited

U.S. PATENT DOCUMENTS

| | | | | |
|---|---|---|---|---|
| 5,228,741 A | * | 7/1993 | Ide ........................ | B62D 21/152 296/187.11 |
| 6,578,909 B1 | | 6/2003 | Reed et al. | |
| 6,659,540 B1 | * | 12/2003 | Ootsuka ............... | B62D 21/152 296/183.1 |
| 6,976,730 B2 | | 12/2005 | Mally et al. | |

(Continued)

FOREIGN PATENT DOCUMENTS

| | | |
|---|---|---|
| DE | 102006012628 | 9/2007 |
| EP | 1927534 | 6/2008 |

(Continued)

*Primary Examiner* — Kiran B Patel
(74) *Attorney, Agent, or Firm* — Rankin, Hill & Clark LLP (57) ABSTRACT

A vehicle frame assembly includes a structural pillar defined by a first structural node, a second structural node, an upper outer member and an upper inner member spaced laterally from the upper outer member. The upper outer member extends substantially vertically between the first and second structural nodes and has first and second end portions connected to the respective first and second structural nodes. The upper inner member is angled laterally inwardly relative to the upper outer member and has a first end portion connected to the first structural node. The first and second structural nodes together with the upper outer and inner members define a first triangular load distribution path for the vehicle frame assembly which is adapted to distribute a roof crush load from the first structural node to the upper outer and inner members.

12 Claims, 6 Drawing Sheets

(56) References Cited

U.S. PATENT DOCUMENTS

| | | |
|---|---|---|
| 7,121,615 B2 | 10/2006 | Hoshino |
| 7,845,713 B2 | 12/2010 | Terai et al. |
| 7,866,738 B2 * | 1/2011 | Andou ................. B62D 25/088 296/193.05 |
| 8,011,719 B2 | 9/2011 | Walter et al. |
| 8,276,980 B2 * | 10/2012 | Boettcher .......... B62D 25/2018 296/193.07 |
| 8,348,321 B2 * | 1/2013 | Yamazaki ............... B60R 13/06 296/1.08 |
| 8,366,184 B2 * | 2/2013 | Ogawa ................. B62D 21/157 296/193.06 |
| 8,388,046 B2 * | 3/2013 | Hutter .................... B62D 25/04 296/187.13 |
| 8,419,113 B2 | 4/2013 | Kunishi et al. |
| 8,651,562 B2 | 2/2014 | Zömack et al. |
| 8,894,136 B2 * | 11/2014 | Shono .................... B62D 25/06 296/203.03 |
| 8,919,865 B2 * | 12/2014 | Ogawa ................... B62D 25/08 296/187.11 |
| 8,967,702 B2 * | 3/2015 | Mochizuki ............. B62D 25/08 296/146.9 |
| 9,145,171 B2 * | 9/2015 | Kuenkler ................ B62D 25/02 |
| 9,302,711 B2 * | 4/2016 | Ebihara ................. B62D 25/08 |
| 9,403,492 B1 * | 8/2016 | Greggs .................. B62D 25/00 |
| 2011/0278880 A1 * | 11/2011 | Tsuyuzaki ............. B60J 5/0425 296/187.11 |
| 2012/0153677 A1 * | 6/2012 | Matsuura ............. B62D 21/152 296/193.08 |
| 2013/0241240 A1 * | 9/2013 | Tokumoto ............ B62D 25/087 296/193.08 |
| 2013/0341970 A1 * | 12/2013 | Shimizu ............... B62D 25/087 296/193.08 |
| 2014/0152054 A1 * | 6/2014 | Yano .................... B62D 25/087 296/193.08 |
| 2014/0159428 A1 * | 6/2014 | Katou .................. B62D 25/087 296/193.08 |

FOREIGN PATENT DOCUMENTS

| | | |
|---|---|---|
| GB | 2120981 | 12/1983 |
| JP | 3622658 | 2/2005 |
| JP | 4161442 | 10/2008 |
| JP | 5201442 | 6/2013 |

* cited by examiner

VEHICLE FRAME ASSEMBLY

BACKGROUND

Typical steel vehicle frame assemblies apply a roof side rail that connects to inner and outer members of a structural pillar (e.g., B-pillar) for crash purposes. On aluminum intensive vehicle frame assemblies various structures are applied to provide rigidity and strength for roof crush. For example, it is known to apply a steel roll hoop construction that is fastened to the aluminum frame assembly. It is also known to apply a steel side panel outer atop of aluminum stampings to form the structural pillar and a rear quarter area. It is further known to apply a steel roof side rail stamping with the inner and outer members of the structural pillar.

Increased crash standards especially for roof crush need to be met in all types of vehicles. When creating a high performance vehicle where weight and packaging space is critical an efficient frame assembly needs to be applied, and rigidity is extremely important due to the increased loads from the suspension and higher cornering performance. And because the frame assembly of the high performance vehicle is typically constructed mostly out of aluminum, conventional stampings, which can have a high investment cost for dies, need to be minimized to reduce the cost impact.

BRIEF DESCRIPTION

According to one aspect, a vehicle frame assembly comprises a structural pillar defined by a first structural node, a second structural node, an upper outer member and an upper inner member spaced laterally from the upper outer member. The upper outer member extends substantially vertically between the first and second structural nodes and has first and second end portions connected to the respective first and second structural nodes. The upper inner member is angled laterally inwardly relative to the upper outer member and has a first end portion connected to the first structural node. The first and second structural nodes together with the upper outer and inner members define a first triangular load distribution path for the vehicle frame assembly which is adapted to distribute a roof crush load from the first structural node to the upper outer and inner members.

According to another aspect, a vehicle frame assembly comprises a first structural node and a second structural node. A longitudinally extending roof side rail has an end portion connected to the first structural node. A laterally extending rear roof rail has an end portion connected to the first structural node. A laterally extending rear cabin panel is connected to the second structural node. An upper outer member extends substantially vertically between the first and second structural nodes and has first and second end portions connected to the respective first and second structural nodes. An upper inner member spaced laterally from the upper outer member has a first end portion connected to the first structural node and a second end portion connected to the rear cabin panel. A longitudinally extending rear quarter upper rail has a first end portion connected the first structural node and a second end portion. A longitudinally extending rear quarter lower rail has a first end portion connected to the second structural node and a second end portion connected to the second end portion of the rear quarter upper rail. The first and second structural nodes together with the upper outer and inner members define a structural pillar, and the structural pillar defines a first triangular load distribution path for the vehicle frame assembly which is adapted to distribute a roof crush load from the first structural node to the upper outer and inner members. The first and second structural nodes together with the upper outer member and the rear quarter upper and lower rails together define a second triangular load distribution path for the vehicle frame assembly which is adapted to distribute the roof crush load from the first structural node to the rear quarter upper and lower rails.

According to another aspect, a vehicle frame assembly comprises a first structural node and a second structural node. A longitudinally extending roof side rail has an end portion connected to the first structural node. A laterally extending rear roof rail has an end portion connected to the first structural node. A laterally extending rear cabin panel is connected to the second structural node. An upper outer member extends substantially vertically between the first and second structural nodes and has first and second end portions connected to the respective first and second structural nodes. An upper inner member spaced laterally from the upper outer member has a first end portion connected to the first structural node and a second end portion connected to the rear cabin panel. The first and second structural nodes together with the upper outer and inner members define a structural pillar, and the structural pillar defines a first triangular load distribution path for the vehicle frame assembly which is adapted to distribute a roof crush load from the first structural node to the upper outer and inner members. An upper cabin ring is defined by the rear roof rail, the first structural node, the upper outer member, the second structural node and the rear cabin panel, the upper cabin ring configured to provide lateral rigidity of the vehicle frame assembly, the first triangular load distribution path being confined within the upper cabin ring.

DETAILED DESCRIPTION

It should, of course, be understood that the description and drawings herein are merely illustrative and that various modifications and changes can be made in the structures disclosed without departing from the present disclosure. In general, the figures of the exemplary vehicle frame assembly are not to scale. As used herein, lateral directions are transverse across the vehicle frame assembly, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle frame assembly disclosed herein are merely terms of art that may vary from one manufacturer to another and should not be deemed to limit the present disclosure.

Figure 1:
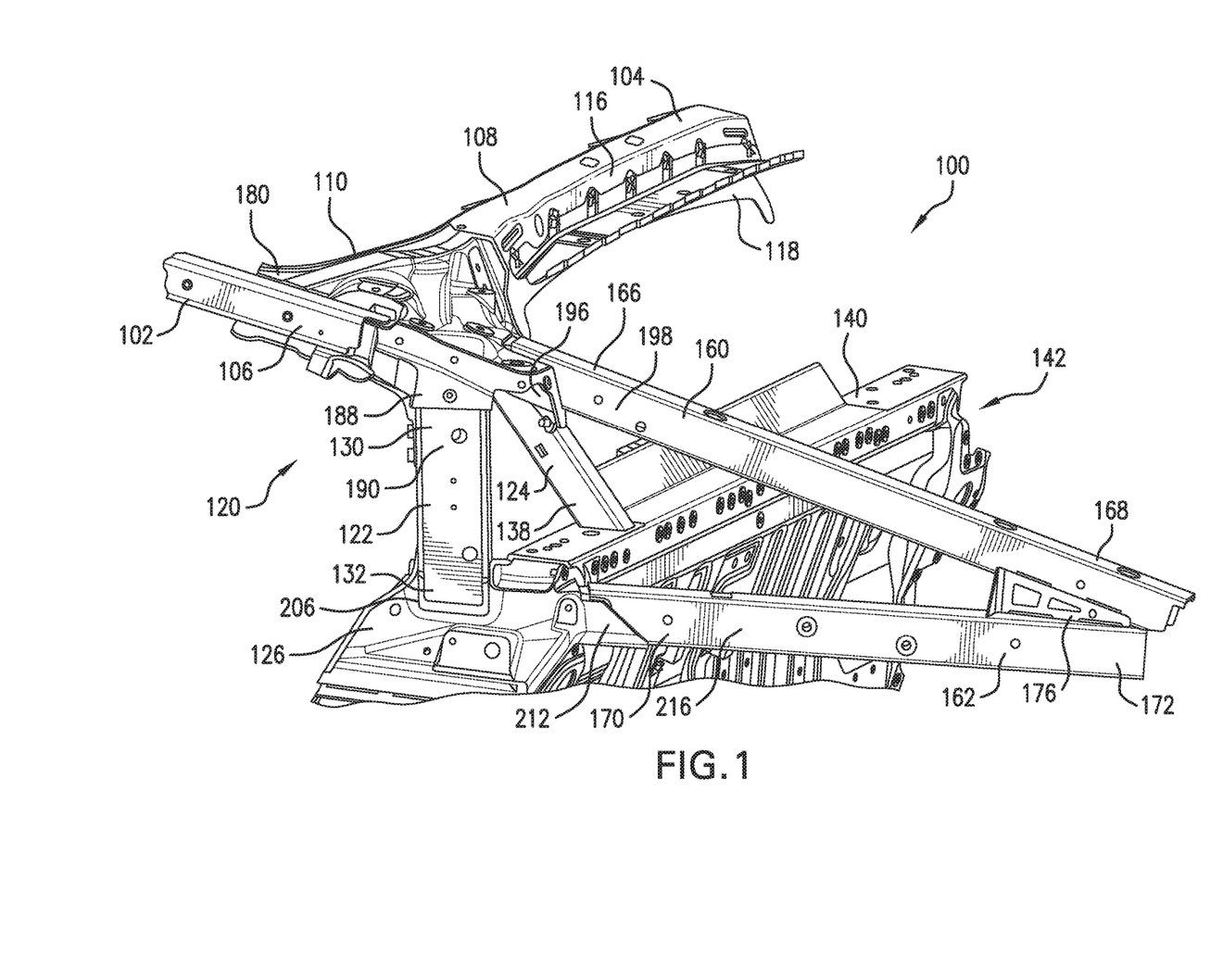
FIG. 1 is an exterior perspective view of a left side of an exemplary vehicle frame assembly according to the present disclosure.
Figure 2:
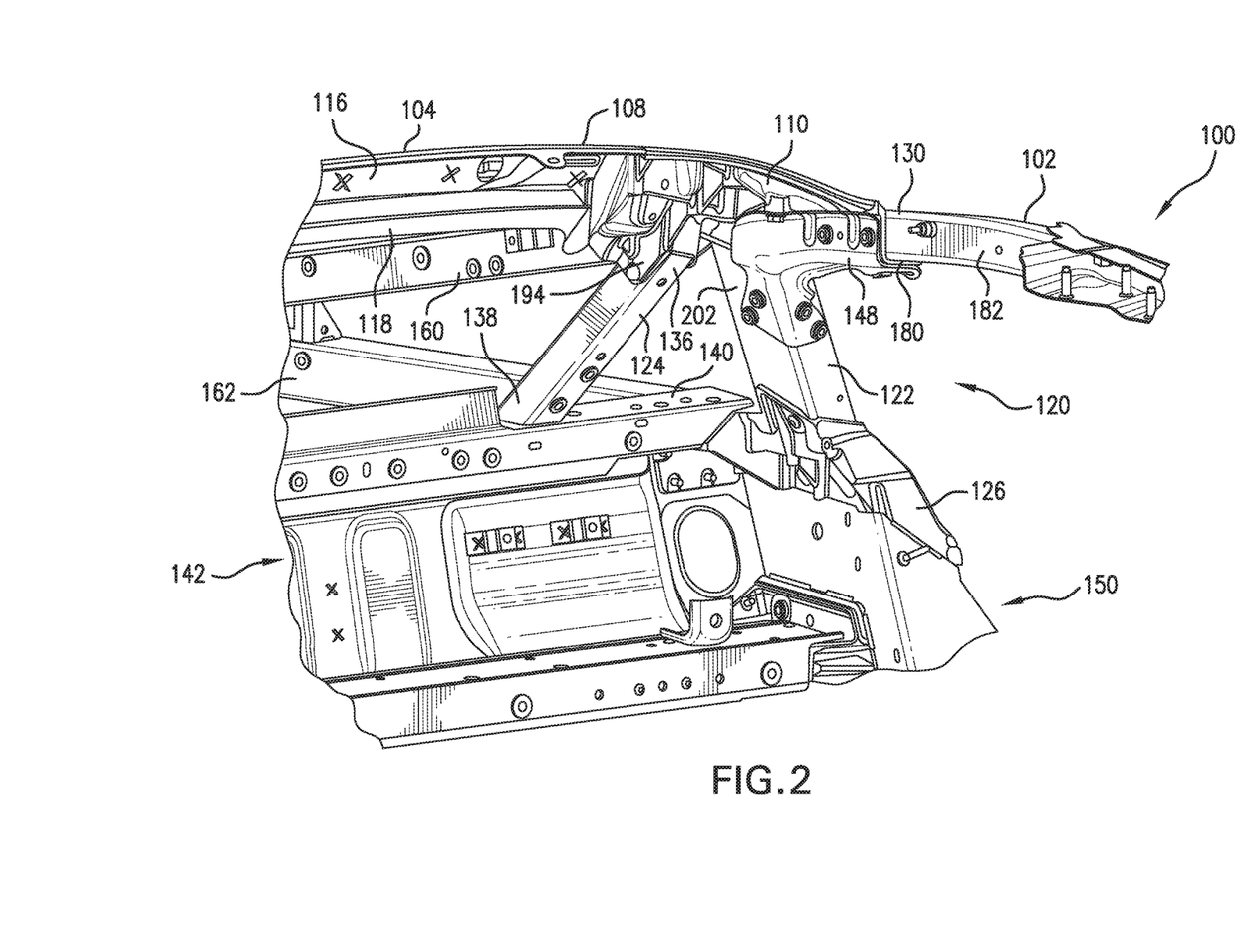
FIG. 2 is an interior perspective view of FIG. 1.

Referring now to the drawings, wherein like numerals refer to like parts throughout the several views, FIGS. 1 and 2 illustrate a left side of an exemplary vehicle frame assembly 100 according to the present disclosure. It should be appreciated that the left and right sides of the vehicle frame assembly 100 may be identically constructed, but for their disposition on opposite sides of the vehicle. To simplify the explanation of the present disclosure, only the structural components provided along the left side of the vehicle frame assembly 100 will be discussed, but it should be understood that the same construction could be used for the right side of the vehicle.

Turning to the figures, the vehicle frame assembly 100 includes a longitudinally extending roof side rail 102 and a laterally extending rear roof rail 104, each having a respective end portion 106, 108 connected to a first upper structural node 110. The roof side rail 102 can be a single (i.e., unitary, one-piece) integrated component having a closed cross-section. According to the depicted embodiment, the roof side rail 102 has a substantially rectangular cross-section, and as used herein the term "substantially rectangular" refers to a rectangle, a square, or another quadrilateral. By way of example, the roof side rail 102 can be made of a substantially rectangular pipe. However, it should be appreciated that the roof side rail 102 can have a substantially circular cross-section (e.g., the roof side rail 102 can be made from a substantially round pipe). Further, it should be appreciated that the roof side rail 102 can have a constant cross-sectional shape along its length. The rear roof rail 104 can also have a closed cross-section and be formed of interconnected substantially U-shaped outer and inner panel members 116, 118 to define a substantially rectangular cross-section.

An upper structural pillar (e.g. upper B-pillar) 120 of the exemplary vehicle frame assembly 100 is defined by the first upper structural node 110, an upper outer member 122, an upper inner member 124 spaced laterally from the upper outer member 124, and a second lower structural node 126. The upper outer member 122 is a substantially vertical structural member and includes a first end portion 130 connected to the first structural node 110 and a second end portion 132 connected to the second lower structural node 126. The upper inner member 124 is a laterally canted or angled structural member (angled laterally inwardly relative to the upper outer member 122) and includes a first end portion 136 connected to the first structural node 110 and a second end portion 138 connected to a cross rail 140 of a laterally extending rear cabin panel 142. It should be appreciated that the upper inner member 124 differs from a typical vehicle construction in that its location on the vehicle frame assembly 100 is typically a blind spot due to styling allowing the upper inner member 124 to at least partially support a rear glass (not shown). Further, the upper inner member 124 is configured to triangulate the upper structural pillar 120 which, in turn, increases the strength and rigidity of the upper structural pillar 120. According to one aspect, each of the upper outer member 122 and upper inner member 124 can be a single (i.e., unitary, one-piece) integrated component having a closed cross-section which can have a constant cross-sectional shape along its length. As depicted in FIGS. 1 and 2, each of the upper outer member 122 and upper inner member 124 can have a substantially rectangular cross-section; although, this is not required and alternative cross-sectional shapes are contemplated. An inner gusset 148 is provided at the connection between the first end portion 130 of the upper outer member 122 and the first structural node 110 to substantially reinforce this part of the upper structural pillar 120. A lower structural pillar 150 (e.g., lower B-pillar) is connected to the second structural node 126 and the rear cabin panel 142.

The vehicle frame assembly 100 further includes a rear quarter upper rail 160 and a rear quarter lower rail 162. As shown, the rear quarter upper rail 160 is a downwardly canted or angled structural member (angled downwardly relative to the upper outer member 122) and has a first end portion 166 connected to the first structural node 110 and a second end portion 168. The rear quarter lower rail 162 is a longitudinally extending structural member and has a first end portion 170 connected to the second structural node 126 and a second end portion 172. According to one aspect, a gusset 176 can interconnect the respective second end portions 168, 172 of the rear quarter upper rail 160 and rear quarter lower rail 162. Again, each of the rear quarter upper rail 160 and rear quarter lower rail 162 can be a single (i.e., unitary, one-piece) integrated component having a closed cross-section which can have a constant cross-sectional shape along its length. As depicted in FIGS. 1 and 2, each of the rear quarter upper rail 160 and rear quarter lower rail 162 can have a substantially rectangular cross-section; although, this is not required and alternative cross-sectional shapes are contemplated.

During the fabrication of the exemplary vehicle frame assembly 100, it is necessary to connect end portions of the above described structural components to each other. Also, due to cosmetic, assembly, and vehicle operational considerations (for example, the structures of the structural components to be connected, the locations of these structural components on the vehicle frame assembly, and the stresses under which the connections will operate during vehicle use), it may not be feasible to form a direct connection between the structural components. As used herein, the term "structural node" is defined as a separate element of the vehicle frame assembly 100 at which and by which two or more of the structural frame components are connected.

As best shown in FIGS. 1 and 2, the first structural node 110 includes a first interior sleeve 180 configured to receive and be fastened to a passenger compartment-side wall section 182 at the end portion 106 of the roof side rail 102. The end portion 108 of the rear roof rail 104 (particularly an end portion of the outer panel member 116) is fitted at least partially over and is secured to the first structural node 110. A second exterior facing sleeve 188 of the first structural node 110 is configured to receive and be fastened to a vehicle exterior-side wall section 190 at the first end portion 130 of the upper outer member 122. A third downward sleeve 194 of the first structural node 110 is configured to receive and be fastened to the first end portion 136 of the inner outer member 124. And a fourth exterior facing sleeve 196 (which is opposite the first sleeve 180) of the first structural node 110 is configured to receive and be fastened to a vehicle exterior-side wall section 198 at the first end portion 166 of the rear quarter upper rail 160. Further, the gusset 148 is configured to be fastened to a passenger compartment-side wall section 202 at the first end portion 130 of the upper outer member 122 and the first sleeve 180. The second end portion 132 of the upper outer member 122 is secured in a cavity 206 of the second structural node 126. An end portion 208 of the cross rail 140 of the rear cabin panel 142 is fitted at least partially over and is secured to the second structural node 126. And an exterior facing sleeve 212 of the second structural node 126 is configured to receive and be fastened to a vehicle exterior-side wall section 216 at the first end portion 170 of the rear quarter lower rail 162.

According to one aspect of the present disclosure, the structural component 102 is formed of a first material and each of the first and second structural nodes 110, 126 are formed of the first material or a second material different than the first material. By way of example, the first material can be a steel or steel based alloy. The second material can be aluminum or aluminum based alloy, allowing the first and structural second nodes 110, 126 to be cast in a single piece and finish machined where necessary. However, the first and second structural nodes 110, 126 may be formed using any suitable process or processes. Further, each of the structural component 104, 122, 124, 160, 162 can be formed of the first material or the second material, and in the present embodiment are formed of the second material. By way of example, the structural component 122, 124, 160, 162 can be an aluminum extrusion and the structural component 104 can be an aluminum stamping. To prevent galvanic corrosion between the differing metals of the first and second materials, it should be appreciated that an electrically nonconductive material (e.g., an electrically nonconductive adhesive) (not shown) can be provided between the structural member 102 and the first structural node 110. Further, because the interface between the structural frame components and each of the first and second structural nodes is exposed to the wet environment, a sealing material (not shown) can be provided at the interface to prevent water leaks into the cabin of the vehicle. It should be appreciated that the electrically nonconductive adhesive further joins the dissimilar metals of the first and second materials and can also function as the sealing material. It should also be appreciated the first and second materials can be a reinforced plastic material and/or a composite material.

As depicted, the inner gusset 148 can be shaped to substantially conform to respective outer surfaces of the first structural node 110 and the upper outer member 122 to substantially reinforce or laminate this part of the upper structural pillar 120. According to one aspect, the gusset 148 can be formed of a steel or steel based alloy. And as indicated above the rear roof rail 102 can also be formed of a steel or steel based alloy and each of the upper outer member 122 and the first structural node 110 can be formed of an aluminum or aluminum based alloy. With this arrangement, the gusset 148 together with the first sleeve 180 of the first structural node 110 and the rear roof rail 102 can define a steel/aluminum/steel laminated structural component of the upper structural pillar 120. And the gusset 148 together with each of the first structural node 110 and the upper outer member 122 can define steel/aluminum laminated structural components of the upper structural pillar 120.

Figure 3:
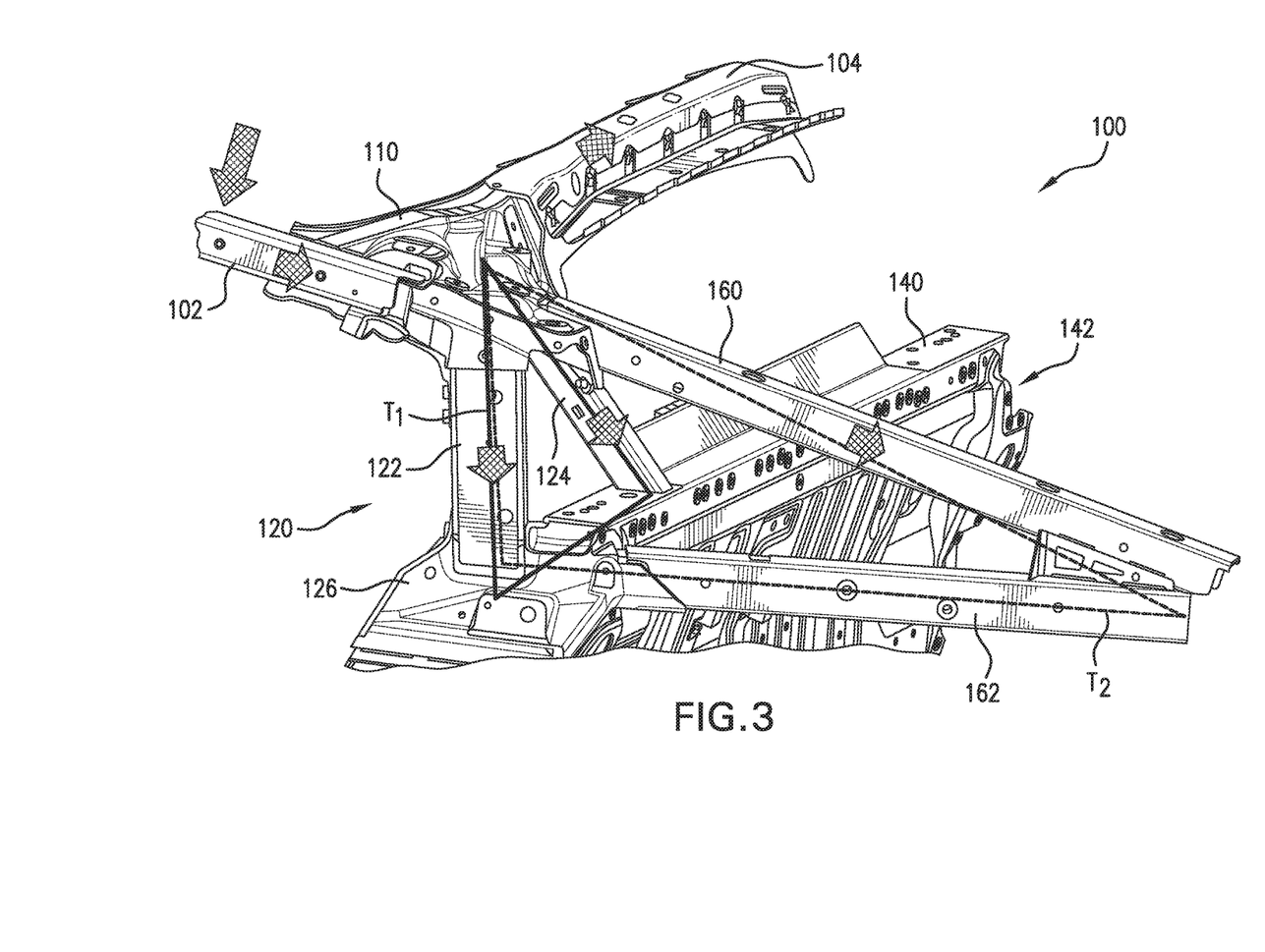
FIG. 3 depicts a roof crush load distribution for the vehicle frame assembly.

From FIGS. 1 and 2, the exemplary vehicle frame assembly 100 centers around the first and second structural nodes 110, 126 to connect all of the surrounding structural frame components 102, 104, 122, 124, 160, 162 including the rear cabin panel 142. By applying the first structural node 110 at the upper structural pillar (e.g. upper B-pillar) 120 the surrounding structural frame components 102, 104, 122, 124, 160 can be efficiently connected which allows for the transferring of loads. More particularly, FIG. 3 depicts a vertical roof crush load applied to the roof side rail 102. The vertical roof crush load is transferred through the roof side rail 102 and into the first structural node 110. To manage the roof crush load from the first structural node 110, two differing load distribution triangles or triangular paths T1 and T2 are defined by the exemplary vehicle frame assembly 100 to stabilize the upper structural pillar 120 (e.g., upper B-pillar). The substantially vertically and laterally oriented first load distribution triangle T1 is defined by the first and second structural nodes 110, 126 together with the upper outer member 122 and the upper inner member 124 (and depending on the arrangement of the upper outer and inner members 122, 124 the triangle T1 is an acute triangle with the converging first end portions 130, 136 defining one of the vertices). According to one aspect, the first load distribution triangle T1 can be further defined by the rear cabin panel 142. The substantially vertically and longitudinally second load distribution triangle T2 is defined by the first and second structural nodes 110, 126 together with the upper outer member 122, the rear quarter upper rail 160 and rear quarter lower rail 162 (and depending on the arrangement of the upper outer member 122 and the rear quarter lower rail 162 the triangle T2 is one of a right or obtuse triangle with the converging first end portions 130, 166 defining one of the vertices). The first load distribution triangle T1 is configured as the main load path sending the vertical roof crush load down through each of the upper outer member 122 and the upper inner member 124. The second structural node 126 and the rear cabin panel 142 stabilize the respective second end portions 132, 138 of the upper outer member 122 and the upper inner member 124 from the roof crush load. The second load distribution triangle T2 is configured to distribute the vertical roof load to the rear quarter upper and lower rails 160, 162 (i.e., to a rear part of the vehicle frame assembly 100). Therefore, because the first and second load distribution triangles T1, T2 absorb a majority of the roof load, minimal roof load is transferred laterally through the rear roof rail 104.

Figure 4:
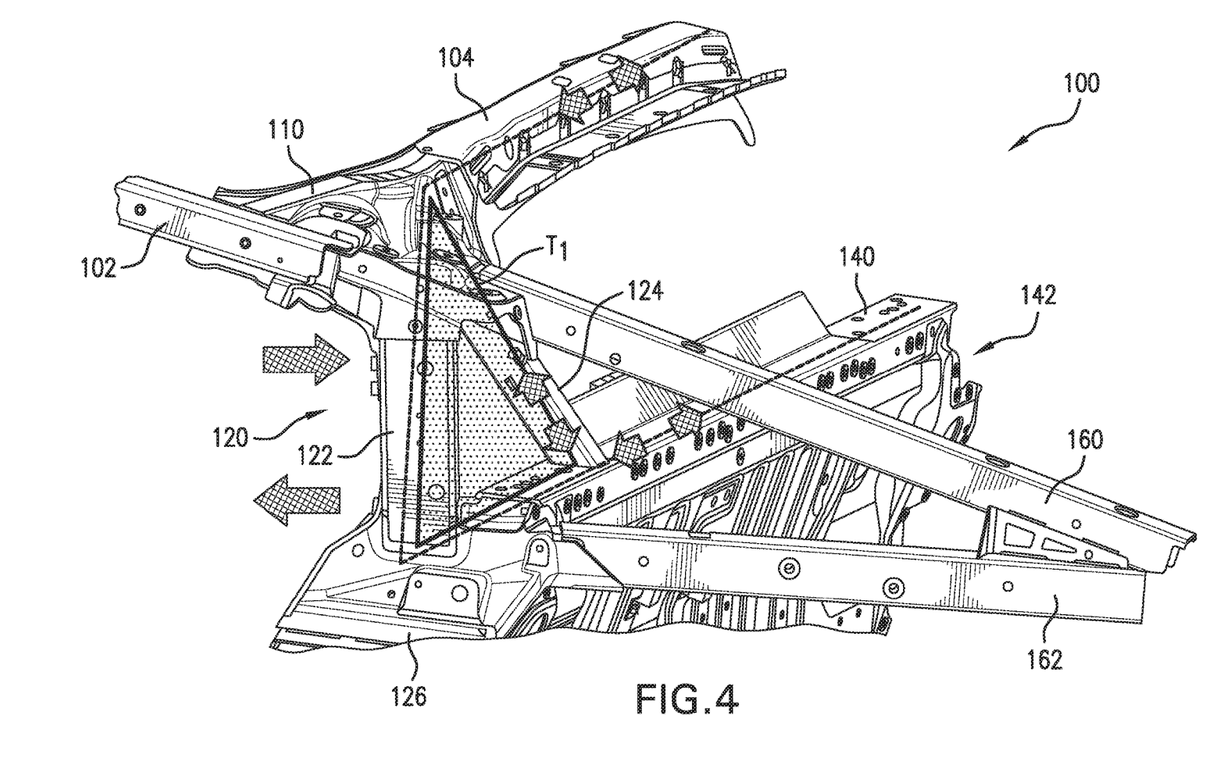
FIG. 4 depicts a longitudinal body loading for the vehicle frame assembly.

With reference to FIG. 4, for vehicle body rigidity, an upper cabin ring (shown by the dashed lines) is created by the first structural node 110, the rear roof rail 104, the upper outer member 122, the second structural node 126, and rear cabin panel 142. This upper cabin ring is adapted to provide cross vehicle rigidity for the rear of the passenger cabin. To account for any possible weakness at the corner connections of the upper cabin ring, the upper inner member 124 triangulates upper and lower corner connection (see the shaded first load distribution triangle T1 of FIG. 4) increasing the stiffness of the corner connections, thus increasing the overall stiffness of the upper cabin ring. Further, the first load distribution triangle T1 is confined within the upper cabin ring (thereby increasing stiffness of the upper cabin ring), and the upper inner member 124 gussets the first structural node 110 for cross/lateral vehicle movement, thereby increasing the stiffness of the vehicle frame assembly 100.

Figure 5:
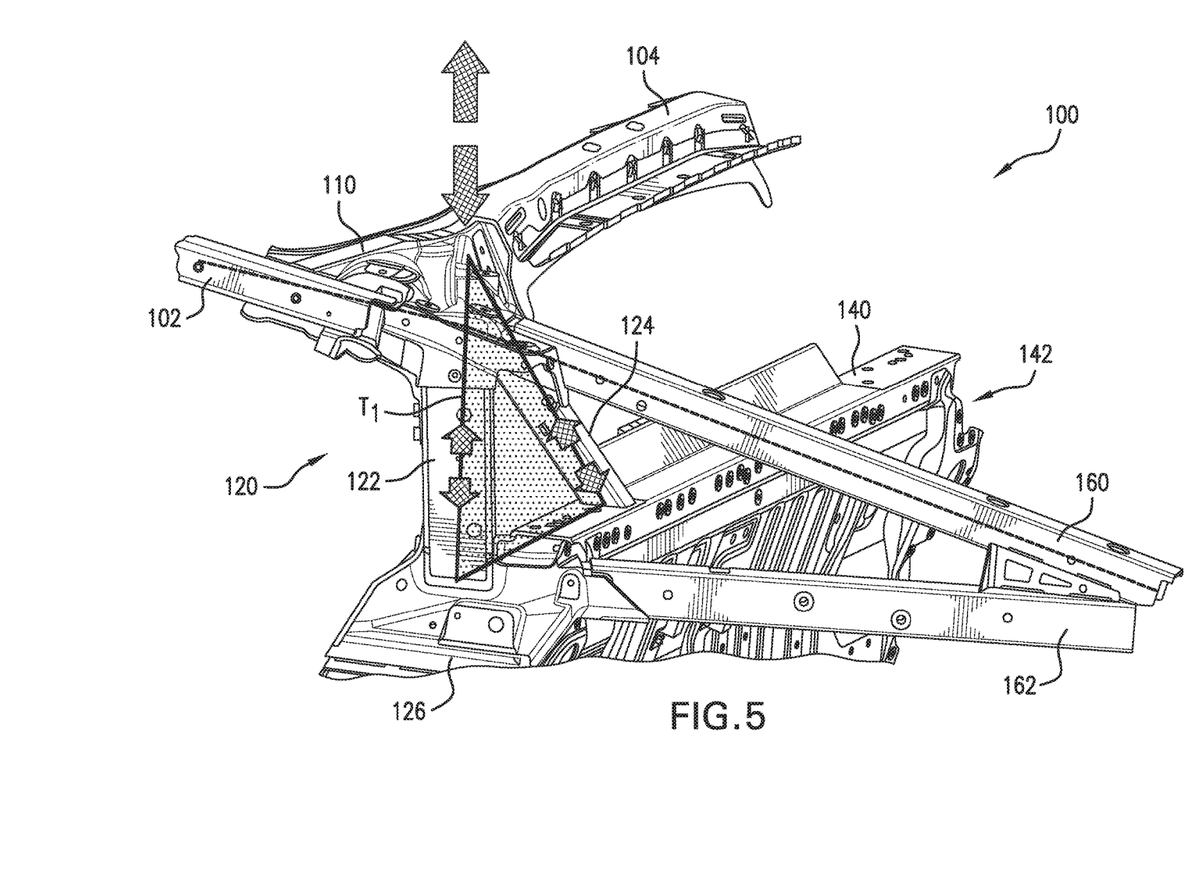
FIG. 5 depicts a lateral body loading for the vehicle frame assembly.

With reference to FIG. 5, the roof side rail 102 is substantially aligned with the rear quarter upper rail 160, and this arrangement allows for the roof side rail 102, the first structural node 110, and the rear quarter upper rail 160 to define a substantially continuous main upper side rail structure (shown by the dashed line) which extends along a majority length of the vehicle frame assembly 100. This main upper side rail structure is configured to move in the vertical directions for frame rigidity and defines a side upper load path. The upper outer member 122 and the upper inner member 124 are configured to support the connection between the roof side rail 102, first structural node 110 and the rear quarter upper rail 160. By supporting the connection, vertical movement of the first structural pillar 110 is prevented and vertical loads are distributed through both the upper outer member 122 and the upper inner member 124. Again, as depicted in FIG. 3, this vertical load is transferred into the triangular body structures (i.e., the first load distribution triangle T1 and the second load distribution triangle T2) increasing frame rigidity.

Figure 6:
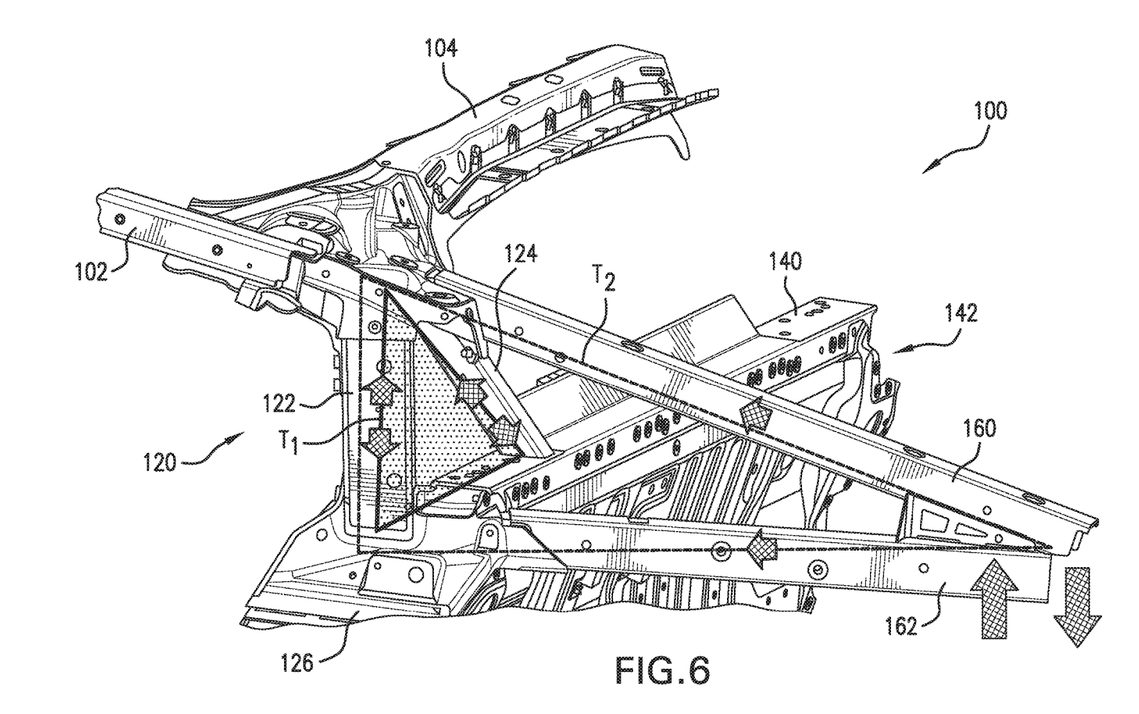
FIG. 6 depicts a rear damper load distribution for the vehicle frame assembly.

A rear damper load applied near or at the respective second end portions 168, 172 of the rear quarter upper rail 160 and rear quarter lower rail 162 is shown in FIG. 6. This rear damper load is a multi-axial load that is transferred into the vehicle frame assembly 100, but the most severe loading direction is vertical. The rear damper load is transferred into the second load distribution triangle T2 including the first and second structural nodes 110, 126. The first load distribution triangle T1 is configured to prevent the rear quarter upper rail 160 and rear quarter lower rail 162 from moving in a lateral direction. And the upper outer member 122 and the upper inner member 124 provide stiffness and absorb the vertical load transferred into the first and second structural nodes 110, 126.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame assembly comprising:
   a first structural node;
   a second structural node;
   a longitudinally extending roof side rail having an end portion connected to the first structural node;
   a laterally extending rear roof rail having an end portion connected to the first structural node;
   a laterally extending rear cabin panel connected to the second structural node;
   an upper outer member extending substantially vertically between the first and second structural nodes and having first and second end portions connected to the respective first and second structural nodes;
   an upper inner member spaced laterally from the upper outer member and having a first end portion connected to the first structural node and a second end portion connected to the rear cabin panel;
   a longitudinally extending rear quarter upper rail having a first end portion connected the first structural node and a second end portion; and
   a longitudinally extending rear quarter lower rail having a first end portion connected to the second structural node and a second end portion connected to the second end portion of the rear quarter upper rail,
   wherein the first and second structural nodes together with the upper outer and inner members define a structural pillar, and the structural pillar defines a first triangular load distribution path for the vehicle frame assembly which is adapted to distribute a roof crush load from the first structural node to the upper outer and inner members, and
   wherein the first and second structural nodes together with the upper outer member and the rear quarter upper and lower rails together define a second triangular load distribution path for the vehicle frame assembly which is adapted to distribute the roof crush load from the first structural node to the rear quarter upper and lower rails.

2. The vehicle frame assembly of claim 1, wherein the first triangular load distribution path is substantially vertically and laterally oriented, and the second triangular load path is substantially vertically and longitudinally oriented.

3. The vehicle frame assembly of claim 1, wherein the upper inner member is angled laterally inwardly relative to the upper outer member, and the rear quarter upper rail is angled downwardly relative to the upper outer member toward the rear quarter lower rail.

4. The vehicle frame assembly of claim 1, wherein the roof side rail is substantially aligned with the rear quarter upper rail, and together with the rear quarter upper rail and the first structural node defines a substantially continuous main upper side rail structure.

5. The vehicle frame assembly of claim 1, wherein an upper cabin ring is defined by the rear roof rail, the first structural node, the upper outer member, the second structural node and the rear cabin panel, the upper cabin ring configured to provide lateral rigidity of the vehicle frame assembly, the first triangular load distribution path being confined within the upper cabin ring and adapted to increase stiffness of the upper cabin ring.

6. The vehicle frame assembly of claim 1, wherein the second triangular load distribution path is adapted to distribute a rear damper load applied at the respective second end portions rear quarter upper and lower rails through the rear quarter upper and lower rails and into the first and second structural nodes.

7. The vehicle frame assembly of claim 6, wherein the first triangular load distribution path is adapted to at least partially absorb the rear damper load thereby preventing lateral movement of the rear quarter upper and lower rails.

8. The vehicle frame assembly of claim 1, wherein the roof side rail is a unitary, one-piece tubular structural member formed of a first material, and each of the rear roof rail, the upper outer member, the upper inner member, the rear quarter upper rail, and the rear quarter lower rail is a unitary, one-piece tubular structural member formed of a second material different than the first material.

9. The vehicle frame assembly of claim 8, wherein each of the rear roof rail, the rear cabin panel, the first structural node and the second structural node is formed of the second material different than the first material.

10. The vehicle frame assembly of claim 1, wherein the structural pillar and the rear cabin panel are configured to stabilize the upper outer and inner members from the roof crush load.

11. The vehicle frame assembly of claim 1, wherein the upper inner member gussets the first structural node to prevent lateral movement of the vehicle frame assembly.

12. The vehicle frame assembly of claim 1, wherein the upper outer member and the upper inner member are configured to support the connection between each of the roof side rail and the rear quarter upper rail with the first structural node.

* * * * *